United States Patent
Liu

(10) Patent No.: US 10,613,812 B2
(45) Date of Patent: Apr. 7, 2020

(54) SYSTEM, CONTROL APPARATUS AND CONTROL METHOD FOR DISTRIBUTED VIDEO DISPLAY

(71) Applicant: VIA Technologies, Inc., New Taipei (TW)

(72) Inventor: Steve Shu Liu, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 103 days.

(21) Appl. No.: 15/654,666

(22) Filed: Jul. 19, 2017

(65) Prior Publication Data

US 2018/0314483 A1    Nov. 1, 2018

(30) Foreign Application Priority Data

Apr. 26, 2017   (CN) .......................... 2017 1 0281994

(51) Int. Cl.
*G06F 3/14*        (2006.01)
*H04N 21/41*    (2011.01)
(Continued)

(52) U.S. Cl.
CPC ............. *G06F 3/1446* (2013.01); *G09G 3/20* (2013.01); *G09G 3/3406* (2013.01); *G09G 5/12* (2013.01);
(Continued)

(58) Field of Classification Search
CPC .................................................. G06F 3/1446
See application file for complete search history.

(56) References Cited

U.S. PATENT DOCUMENTS

| 2009/0115751 A1* | 5/2009 | Gover ................... G06F 3/1446 345/204 |
| 2013/0278483 A1 | 10/2013 | Buld et al. |
| 2017/0278485 A1* | 9/2017 | Chen ......................... G06F 3/14 |

FOREIGN PATENT DOCUMENTS

| TW | 200406736 | 5/2004 |
| TW | 201310413 | 3/2013 |
| TW | 201413577 | 4/2014 |

OTHER PUBLICATIONS

"Office Action of Taiwan Counterpart Application," dated Oct. 26, 2017, p. 1-p. 10, in which the listed references were cited.
(Continued)

*Primary Examiner* — Roy P Rabindranath
(74) *Attorney, Agent, or Firm* — JCIPRNET

(57) ABSTRACT

A system, a control apparatus and a control method for distributed video display are provided. The system includes an image source device configured to provide image data, a plurality of displays, a plurality of display chips respectively coupled to the displays and connected with the video source device through a network, and a control apparatus connected with the image source device and the display chips through the network and configured to transmit a playback signal to each of the display chips to control the display chips to receive the image data from the image source device and convert the received image data into display frames capable of being played by the displays. The control apparatus further transmits a synchronizing signal to each display chip to control the display chips to synchronize the clocks with each other according to the synchronizing signal and sets each of the display chips with a fixed delay time after receiving the image data to synchronously play the display frames on the displays.

14 Claims, 5 Drawing Sheets

(51) Int. Cl.
*H04N 5/268* (2006.01)
*G09G 3/34* (2006.01)
*G09G 5/18* (2006.01)
*G09G 5/12* (2006.01)
*G09G 3/20* (2006.01)

(52) U.S. Cl.
CPC .............. *G09G 5/18* (2013.01); *H04N 5/268* (2013.01); *H04N 21/4122* (2013.01); *G09G 2300/026* (2013.01); *G09G 2370/022* (2013.01)

(56) References Cited

OTHER PUBLICATIONS

"Office Action of Taiwan Counterpart Application," dated Dec. 28, 2017, p. 1-p. 11, in which the listed references was cited.

\* cited by examiner

SYSTEM, CONTROL APPARATUS AND CONTROL METHOD FOR DISTRIBUTED VIDEO DISPLAY

CROSS-REFERENCE TO RELATED APPLICATION

This application claims the priority benefit of China application serial no. 201710281994.2, filed on Apr. 26, 2017. The entirety of the above-mentioned patent application is hereby incorporated by reference herein and made a part of this specification.

BACKGROUND

Field of the Invention

The invention is directed to a display system, a display apparatus and a display method and more particularly, to a system, a control apparatus and a control method for distributed video display.

Description of Related Art

A current solution for distributed video display may be implemented by field-programmable gate arrays (FPGA). However, a programmable interconnection mechanism of the FPGA have to be implemented by a plurality of physical nodes and a plurality of physical switches, which highly relies on physical distribution of the circuit. As a result, difference occurs between the display in the center region and the display in the peripheral region in an application for high-resolution distributed video display.

Another solution for distributed video display may be implemented by system-on-chips (SOC), and based on a standard network protocol, each client can connect to an internal network (intranet) and/or an external network (internet). In a distributed video display system, each SOC corresponds to one of a plurality of displays for distributed video display.

Nevertheless, each of the SOCs operates according to its clock, as time goes, difference between the clocks of the SOCs also increases while phase difference between vertical synchronizing (vSync) signal pulses of each SOC also increases with time. During a process of distributed video display, if a phase difference or more occurs between the vSync signals of any two SOCs, it results in display difference of a frame. From the viewpoint of a user, the user may observe screen tearing.

In addition, the hardware and software configuration such as an OS, an application, and an application programming interface (API) of each SOC varies from one another, and such difference would cause difference in data processing. For example, for video signal decoding, different SOCs have different processing times. The aforementioned differences all may result in screen asynchronization when the distributed video display system plays the video, which increases the risks of screen tearing.

SUMMARY

Accordingly, the invention provides a system, a control apparatus and a control method for distributed video display, which can effectively improve the asynchronization of display frames due to the differences among a plurality of system-on-chips (SOC), thereby mitigating the risks of screen tearing.

A system for distributed video display of the invention includes an image source device, a plurality of displays, a plurality of display chips and a control apparatus. The image source device is configured for providing image data. The display chips are respectively coupled to the displays and connected with the image source device through a network. The control apparatus is connected with the image source device and the display chips through the network and configured for transmitting a playback signal to each of the display chips so as to control the display chips to receive the image data from the image source device and converting the image data into display frames capable of being played by the displays. The control apparatus further transmits a synchronizing signal to each of the display chips so as to control the display chips to synchronize the clocks with each other according to the synchronizing signal and sets each of the display chips with a fixed delay time after receiving the image data to synchronously play the display frames on the displays.

A control apparatus for distributed video display of the invention includes a clock, a communication module and a processor. The communication module is connected with an image source device and display chips through a network to transmit a playback signal to each of the display chips. The processor is coupled to the clock and the communication module and configured to control the display chips to receive image data from the image source device and convert the image data into display frames capable of being played by the displays. The processor further transmits a synchronizing signal to each of the display chips so as to control the display chips to synchronize the clocks with each other according to the synchronizing signal and sets each of the display chips with a fixed delay time after receiving the image data to synchronously play the display frames on the displays.

The invention provides a control method for distributed video display adapted for a control apparatus to control a plurality of display chips to synchronously play display frames on corresponding displays. The control method includes transmitting a synchronizing signal to each of the display chips by the control apparatus so as to control the display chips to synchronize the clocks with each other according to the synchronizing signal and setting each of the display chips with a fixed delay time after receiving image data from an image source device on each of the display chips to synchronously play the display frames converted from the image data on the corresponding displays by the control apparatus.

Based on the above, in the system, the control apparatus and the control method for distributed video display provided by the invention, the clock synchronization are performed between the control apparatus and the display chips to synchronize the clock of the control apparatus and the clock of each of the display chips, and each of the display chips is set to synchronously play the display frames after the fixed delay time. Moreover, the control apparatus further controls each of the display chips to reset the vSync signal after the fixed delay time. In this way, the synchronous playback by a plurality of displays can be achieved, and the issue of screen tearing can be prevented.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
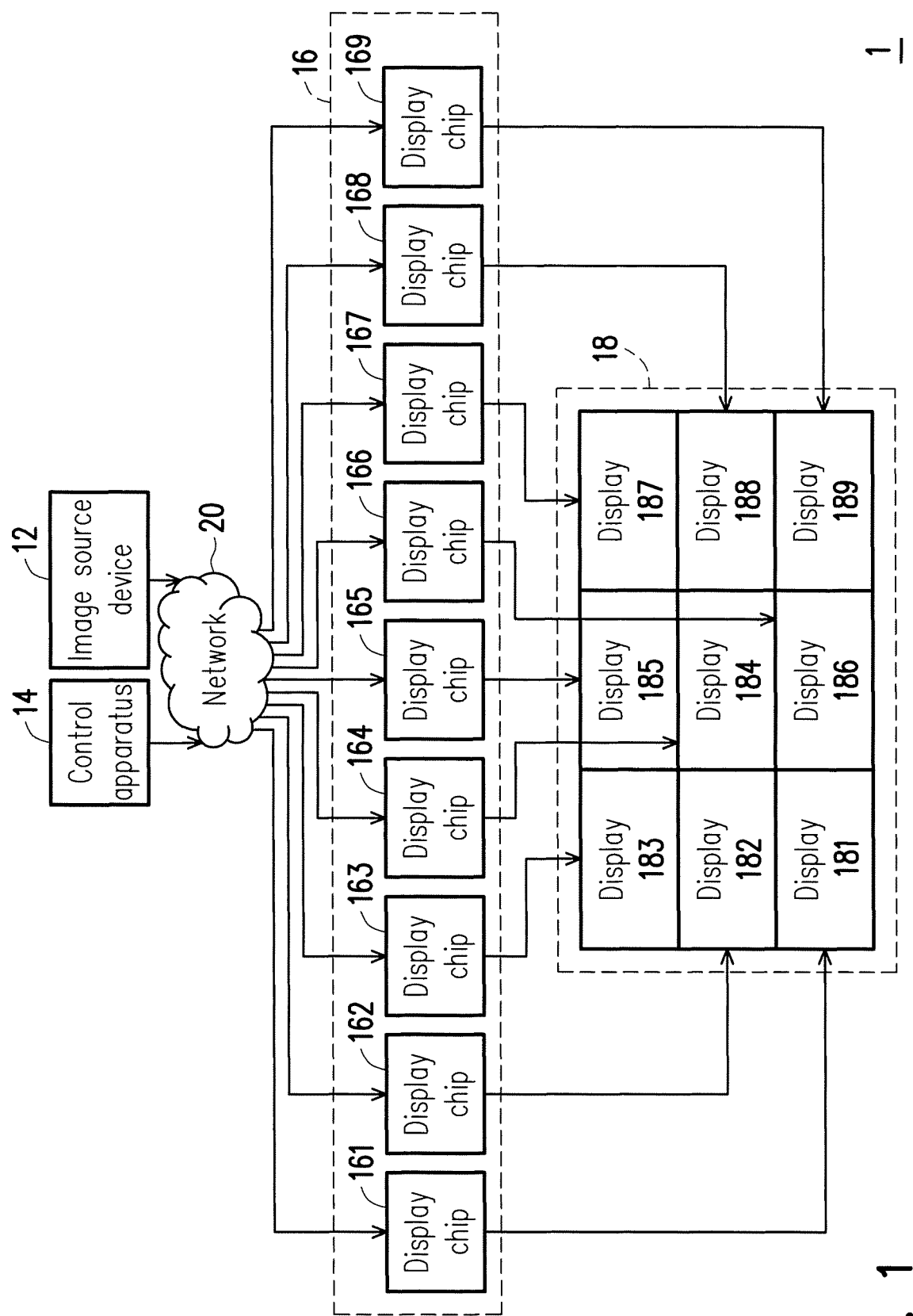
FIG. 1 is a schematic diagram illustrating a system for distributed video display according to an embodiment of the invention.

Referring to FIG. 1, FIG. 1 is a schematic diagram illustrating a system for distributed video display according to an embodiment of the invention. In the embodiment illustrated in FIG. 1, a distributed video display system 1 includes an image source device 12, a control apparatus 14, a plurality of display chips 16 and a plurality of displays 18, and functions thereof will be respectively described as below.

The image source device 12 is, for example, an electronic apparatus capable of providing image data through a network 20, such as a network video camera, a decoder, a streaming server, a network video recorder (NVR) or a combination of the aforementioned apparatuses.

The display chips 16 include display chips 161-169, and each of the display chips 161-169 is, for example, a system-on-chip (SOC) which may include a processor (e.g., a microcontroller, a microprocessor or a digital signal processor) and a memory (e.g., a read-only memory (ROM), a random access memory (RAM), an electrically erasable programmable read only memory (EEPROM) or a flash memory) to operate an operating system (e.g., Windows or Linux) and other applications. Each of the display chips 161-169 may also include a connection interface (e.g., a universal serial bus (USB) interface, a firewire interface, an Ethernet interface, a universal asynchronous receiver/transmitter (UART) interface, a serial peripheral interface bus (SPI) interface) and may be connected with an external apparatus.

The displays 18 include, for example, displays 181-189, which may be combined to form a TV wall in an arrangement as illustrated in FIG. 1 to play different parts of an image or different images. Each of the displays 181-189 is a screen or a TV using a liquid crystal display (LCD), light-emitting diode (LED) or field emission display (FED) or any other panel as a display panel and using cold cathode fluorescent lamps (CCFL) or light-emitting diodes (LED) as a backlight module. The displays 181-189 are respectively connected with the corresponding display chips 161-169 through a display interface, such as a video graphics array (VGA) interface, a digital visual interface (DVI), a high definition multimedia interface (HDMI), a display port (DP) so as to receive display frames from the display chips 161-169 to display the display frames on the display panels.

The distributed video display system 1 of the present embodiment may include the display chips 16 and the displays 18 in greater numbers, while the arrangement of the displays 18 is not limited to the TV wall illustrated in FIG. 1 and may be dispersedly arranged. The numbers and the arrangement manners of the display chips 16 and the displays 18 are not limited in the present embodiment.

The control apparatus 14 is, for example, a computing apparatus (e.g., a personal computer, a server or a workstation) or a portable electronic apparatus (e.g., a cell phone or a tablet computer) having computation capability and may be connected with the image source device 12 and the display chips 16 through the network 20 so as to control the display chips 16 to receive image data from the image source device 12, convert the image data into display frames, and then play the display frames on the displays 18. The control apparatus 14 may control the display chips 16 in the following tasks: (a) contents to be played, (b) when to play the contents, (c) from which image source device 12 to receive the image data, and (d) synchronous playback content (i.e., the same video image played at the same time).

Figure 2:
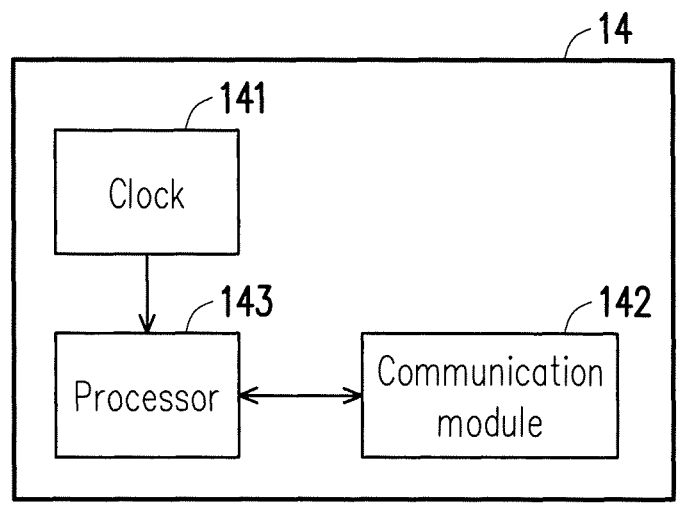
FIG. 2 is block diagram illustrating a control apparatus for distributed video display according to an embodiment of the invention.

To be specific, referring to FIG. 1 and FIG. 2 simultaneously, FIG. 2 is block diagram illustrating a control apparatus for distributed video display according to an embodiment of the invention. As illustrated in FIG. 2, the control apparatus 14 includes a clock 141, a communication module 142 and a processor 143. The clock 141 may provide a clock signal required for the operation of the processor 143. The communication module 142 is, for example, a network card or a network device supporting Ethernet or a wireless network standard, e.g., 802.11g, 802.11n, 802.11ac or 802.1as, and allow the control apparatus 14 to be connected with the network 20 in a wired or a wireless manner, thereby connecting other apparatuses on the network 20 (e.g., the image source device 12 and the display chips 16). The processor 143 is, for example, a central processing unit (CPU), or other programmable general purpose or special purpose microprocessor, digital signal processor (DSP), programmable controller, application specific integrated circuit (ASIC), programmable logic device (PLD) or other similar devices or a combination of the above devices capable of loading and executing programs to carry out the control of the display chips 16.

The processor 143 of the control apparatus 14 is connected with the network 20 through, for example, the communication module 142 and transmits a playback signal to each of the display chips 161-169 through the network 20, so as to control the display chips 161-169 to receive the image data from the image source device 12. Each of the display chips 161-169 is capable of, for example, identifying an encoding format (e.g., MPEG-4, H.264 or the like) of the image data and executing corresponding decoders to convert the image data into display frames capable of being played by the displays 181-189. The displays 181-189 may then receive the converted display frames from the display chips 161-169 connected therewith to display the display frames.

It should be mentioned that in addition to the control of the video playback, the processor 143 of the control apparatus 14 may further transmit a synchronizing signal to each of the display chips 161-169 through the network 20 by using the communication module 142, so as to control the display chips 161-169 to synchronize clocks with one another according to the synchronizing signal.

Figure 3:
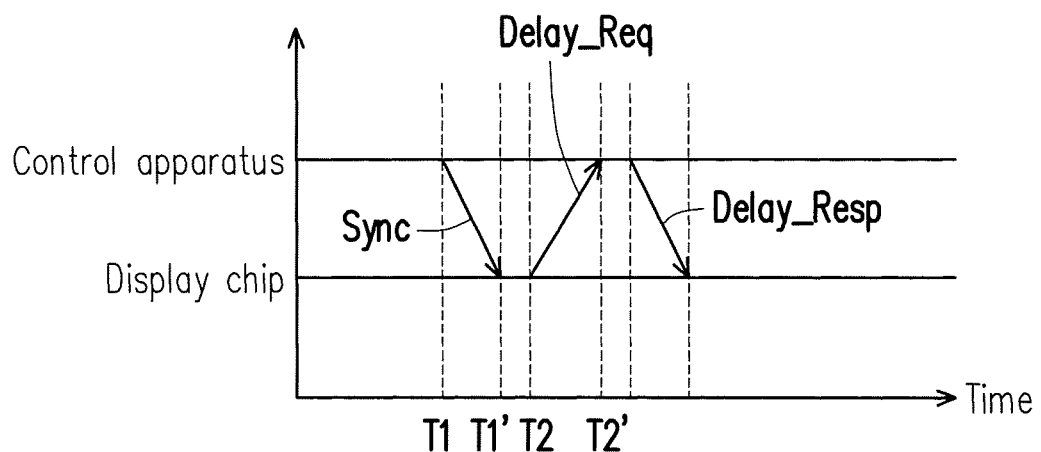
FIG. 3 is a schematic diagram illustrating clock synchronization according to an embodiment of the invention.

Specifically, FIG. 3 is a schematic diagram illustrating clock synchronization according to an embodiment of the invention. Referring to FIG. 2 and FIG. 3 simultaneously, the processor 143 of the control apparatus 14, for example, transmits a synchronizing message Sync to each of the display chips 161-169 (wherein the display chip 161 is taken as an example for description) through the network 20 by using the communication module 142 according to a clock signal transmitted by the clock 141. The synchronizing message Sync includes a timestamp T1 recording a time when the processor 143 transmits the synchronizing message Sync. After receiving the synchronizing message Sync from the control apparatus 14, the display chip 161 records a timestamp T1' of receiving the synchronizing message Sync.

Then, after receiving the synchronizing message Sync, the display chip 161 transmits a delay request message Delay_Req to the control apparatus 14 after a first delay time and also records a timestamp T2 of transmitting the delay request message Delay_Req. Then, after receiving the delay request message Delay_Req through the communication module 142, the processor 143 of the control apparatus 14 transmits the delayed response message Delay_Resp to the display chip 161 through the network 20 by using the communication module 142 after a second delay time. The delayed response message Delay_Resp includes a timestamp T2' recording a time when the processor 143 receives the delayed response message Delay_Resp.

Lastly, the display chip 161 may calculate a time offset of a clock of the display chip 161 with respect to the clock 141 of the control apparatus 14 according to the recorded or obtained timestamps T1, T1', T2 and T2' based on a condition that the transmission time of the synchronizing message Sync and the transmission time of the delay request message Delay_Req should be consistent.

Specifically, after receiving the synchronizing message Sync from the control apparatus 14 through the network 20, the display chip 161 may obtain the timestamps T1 and T1', and their relation is as below:

$$T1'-T1=\tilde{o}+d \qquad (1)$$

Therein, õ represents the time offset of clock of the display chip 161 with respect to the clock 141 of the control apparatus 14, and d represents the transmission time of the message.

On the other hand, after receiving the delayed response message Delay_Resp from the control apparatus 14 through the network 20, the display chip 161 may obtain the timestamps T2 and T2', and their relation is as below:

$$T2'-T2=-\tilde{o}+d \qquad (2)$$

Under the assumption that the transmission time d of the synchronizing message Sync and the delay request message Delay_Req are the same, by combining formulas (1) and (2), the time offset õ of the clock of the display chip 161 with respect to the clock 141 of the control apparatus 14 may be obtained by using the following formula:

$$\tilde{o}=(T1'-T1-T2'+T2)/2 \qquad (3)$$

Based on the above calculation, each of the display chips 161-169 may calculate the time offset õ of the clock thereof with respect to the clock 141 of the control apparatus 14, thereby performing phase adjustment for the clock thereof according to the time offset õ, such that the clock of each of the display chips 161-169 may be synchronized with the clock 141 of the control apparatus 14. Finally, when the clocks of all of the display chips 161-169 are synchronized with the clock 141 of the control apparatus 14, the clocks of the display chips 161-169 achieve synchronization.

By the method describe above, the embodiment may achieve microsecond clock synchronization, i.e., a difference between the clock of the control apparatus 14 and the clock of each of the display chips 161-169 is only tens or hundreds of microseconds, and the accurate clock synchronization may facilitate subsequently regulating accurate playback time for the frames to prevent the occurrence of screen tearing.

It should be noted that in other embodiments, the processor 143 of the control apparatus 14 may be incapable of obtaining the timestamp of transmitting the synchronizing message Sync and recoding the timestamp in the synchronizing message Sync while transmitting the synchronizing message Sync, but have to wait for the completion of the transmission to obtain the correct timestamp from its network hardware. In this circumstance, the processor 143 of the control apparatus 14 additionally requires another message for transmitting the timestamp. In detail, the processor 143 of the control apparatus 14, for example, transmits another continuation message recording the timestamp T1 of transmitting the synchronizing message to each of the display chips 161-169 after transmitting the synchronizing message Sync to each of the display chips 161-169 through the network 20 by using the communication module 142. In this way, each of the display chips 161-169 is capable of obtaining the timestamp T1 for performing the subsequent step of calculating the clock time offset by receiving the continuation message.

The clock synchronization among the display chips can be achieved by the above-described method; however, since the timing of the each clock itself is different from one another, asynchronization of the clocks may repeatedly occur as the time goes. Accordingly, in an embodiment, the control apparatus transmits a synchronizing signal to each of the display chips, for example, per a predetermined time to synchronize the clocks of the display chips with one another according to the synchronizing signal, thereby ensuring the clock synchronization to be performed again before the tearing of the display frames occurs due to asynchronization among the display chips. In another embodiment, the control apparatus transmits the synchronizing signal to each of the display chips, for example, after the playback of the display frames of the current image data ends and before display frames of a next image data are played, such that the display chips may synchronize the clocks thereof with one another according to the synchronizing signal. In this way, black frames may be prevented from occurring to the display frames due to the clock synchronization, thereby preventing viewers' visual experiences from being influenced.

It should be noted that after each of the display chips receives the image data, due to factors that, for example, the image data is not immediately processed by the operating system, it needs time to call an application programming interface (API), or the execution of data processing (e.g., image decoding) during the process of converting the image data into the display frames, lengths of processing times may be different, which causes inconsistency in times of finally outputting the display frames, and as a result, screen tearing occurs.

As such, in the embodiments of the invention, the control apparatus sets a fixed playback time for each of the display chips, namely, the control apparatus controls the display chips to synchronously play the display frames on the displays after a fixed delay time after the display chips receive the image data. The length of the fixed delay time may be determined by the control apparatus evaluating processing performance of each of the display chips, thereby ensuring that each of the display chips completes the conversion of the display frames after the fixed delay time, so as to synchronously play the display frames on the displays.

Figure 4:
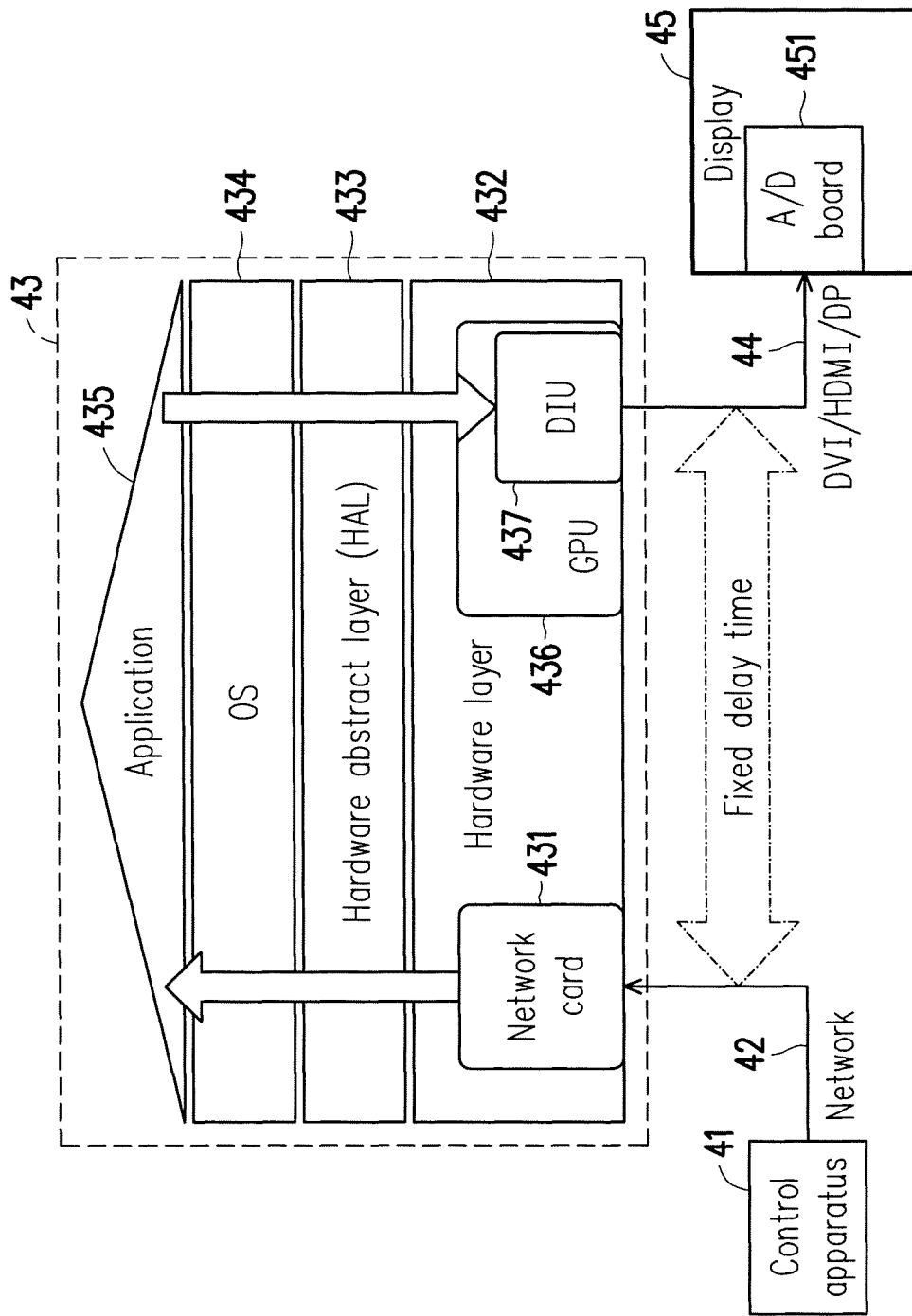
FIG. 4 is a schematic diagram illustrating image data processing delay according to an embodiment of the invention.

Specifically, referring to FIG. 4, FIG. 4 FIG. 4 is a schematic diagram illustrating image data processing delay according to an embodiment of the invention. In FIG. 4, a display chip 43, under the control of a control apparatus 41 through a network 42, receives image data through a network card 431 of a hardware layer 432. The data passing to an application 435 through a hardware layer 432, a hardware abstraction layer (HAL), an operating system (OS) 434 is processed by the application 435 and finally output by a display interface unit (DIU) 437 of a graphics processing unit (GPU) 436 located in the hardware layer 432 through the OS 434 and the HAL 433. The output display frames are sent to an A/D board 451 of a display 45 through a display interface 44 (e.g., a digital visual interface (DVI), a high definition multimedia interface (HDMI) or a display port (DP)) and finally displayed on the display 45.

In the aforementioned process of data processing, processing times of the hardware layer, the HAL, the OS and the application of different display chips are inconsistent with one another, such that elapsed times from the image data entering the display chips to the display frames being output from the display chips are different. Namely, different display chips have different processing delay times. To this regard, in the embodiments of the invention, a fixed delay time from a time point of the image data entering the display chips to a time point of the display frames being output is set, and with the fixed delay time, the application, the OS, the HAL and the hardware layer of each of the display chips are provided with sufficient times to process not only the current frames, but also more subsequent frames. Additionally, by combining the aforementioned accurate clock synchronization with the setting of the fixed delay time, it may be ensured that all of the display chips may synchronously output the display frames to play the display frames on the displays, so to avoid the occurrence of screen tearing.

It should be noted that besides synchronously playing the display frames in the fixed delay time, each of the display chips also resets a vertical synchronizing (vSync) signal for the playback of the display frames by using a register of a display interface unit (DIU) in the fixed delay time or before the fixed delay time, thereby ensuring the output or the flip operation of all of the display frames to be completed within a display synchronization blank (vBlank) period.

Specifically, as the difference exists among the clocks of the display chips, the vSync signals of the display chips may start at different times (which is referred to as phase difference). Taking the frame rate of 50/60/120 fps (frame per second) of current general displays for example, periods of the vSync signals of the display chips are 20/16.7/8.3 milliseconds (ms). Thus, in a condition that waiting for the vSync signals, the fixed delay time set above may probably be not accurate enough and may cause a delay of 16.7 ms in the worst case. To this regard, in the embodiments of the invention, by resetting the vSync signals for controlling the display chips to play the display frames by using the registers in the DIUs before the display frames are output, the display frames may be ensured to be synchronously played.

Figure 5:
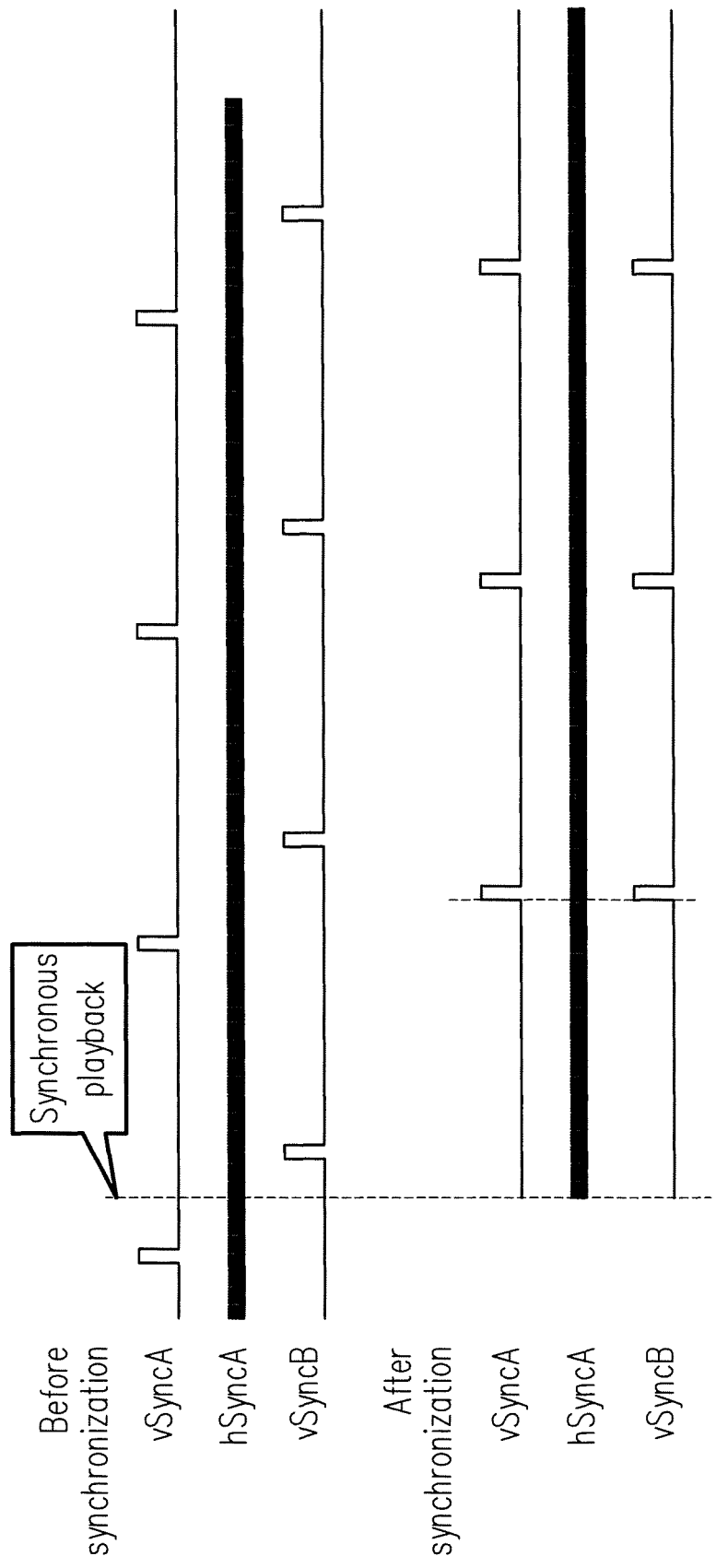
FIG. 5 is a schematic diagram illustrating the synchronization of the vertical synchronizing (vSync) signal of each display chip according to an embodiment of the invention.

Referring to FIG. 5, FIG. 5 is a schematic diagram illustrating the synchronization of the vSync signal of each of the display chips according to an embodiment of the invention. As illustrated in FIG. 5, before the vSync signals are synchronized, an offset exists between vSync signals vSync A and vSync B of different display chips, which may cause asynchronous playback of the image frames at a time point predetermined for synchronous playback. To this regard, before the time point for synchronous playback, the vSync signals vSync A and vSync B are reset, thereby ensuring that the vSync signals vSync A and vSync B of different display chips are also synchronous at the time point for the synchronous playback of the frames (horizontal synchronizing (hSync A) signals may also be synchronous).

Figure 6:
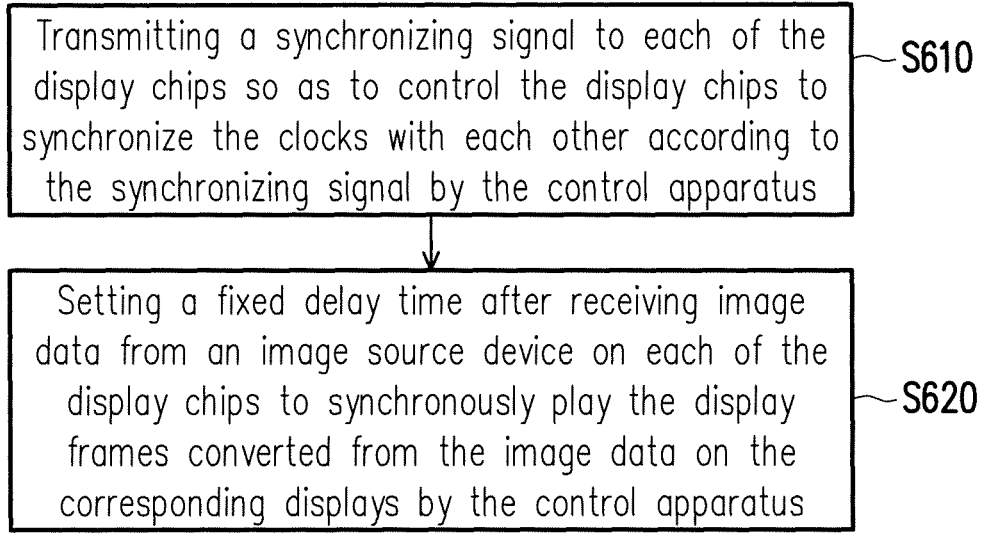
FIG. 6 is a flowchart illustrating a control method for distributed video display according to an embodiment of the invention.

Referring to FIG. 1 and FIG. 6, FIG. 6 is a flowchart illustrating a control method for distributed video display according to an embodiment of the invention. The method of the present embodiment is applicable to the distributed video display system 1 of the above-described embodiment. First, in step S610, the control apparatus 14 transmits a synchronizing signal to the plurality of display chips 16 so as to control each of the display chips 161-169 to synchronize the clocks with one another according to the synchronizing signal. Thereby, the clock of the control apparatus 14 is synchronous with the clock of each of the display chips 161-169. In step S620, the control apparatus 14 sets a fixed delay time after receiving image data from an image source device on each of the display chips 161-169 to synchronously play the display frames on the plurality of displays 18, such that each of the display chips 161-169 is capable of synchronously playing the display frames to prevent the occurrence of screen tearing.

Detailed implementation of the control method of the present embodiment has been described in the embodiments illustrated in FIG. 1 to FIG. 5 and will not be repeated.

To summarize, in the system, the control apparatus and the control method for distributed video display provided by the invention, the clock synchronization are performed between the control apparatus and the display chips, and the display frames are set to be synchronously played after the fixed delay time. Thereby, from the image source device to the displays, the playback time accuracy can be kept in microsecond, so as to achieve zero frame delay of the distributed video display system.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A system for distributed video display, comprising:
    an image source device, providing image data;
    a plurality of displays;
    a plurality of display chips, respectively coupled to the displays and connected with the image source device through a network; and
    a control apparatus, connected with the image source device and the display chips through the network, transmitting a playback signal to each of the display chips so as to control the display chips to receive the image data from the image source device and converting the image data into display frames capable of being displayed by the displays, wherein
    the control apparatus further transmits a synchronizing signal to each of the display chips so as to control the display chips to synchronize clocks with each other based on time offsets of the clocks of the display chips with respect to the clock of the control apparatus according to the synchronizing signal and sets each of the display chips with a fixed delay time after receiving the image data to synchronously play the display frames on the displays, wherein the control apparatus transmits a synchronizing message to each of the display chips, wherein the synchronizing message comprises a first timestamp of a time when the control apparatus transmits the synchronizing message, or after transmitting the synchronizing message, the control apparatus transmits a continuation message recording the first timestamp;

each of the display chips receives the synchronizing message, records a second timestamp of receiving the synchronizing message and after a first delay time, transmits a delay request message to the control apparatus and records a third timestamp of transmitting the delay request message;

the control apparatus receives the delay request message and transmits a delayed response message to each of the display chips, wherein the delayed response message comprises a fourth timestamp of a time when the control apparatus receives the delay request message; and each of the display chips calculates a time offset of the clock thereof with respect to the clock of the control apparatus according to the first timestamp, the second timestamp, the third timestamp and the fourth timestamp.

2. The system according to claim 1, wherein each of the display chips further resets a vertical synchronizing (vSync) signal for playing the display frames by using a register in a display interface unit (DIU) in the fixed delay time or before the fixed delay time.

3. The system according to claim 1, wherein the control apparatus transmits the synchronizing signal to each of the display chips per a predetermined time so as to control the display chips to synchronize the clocks with each other according to the synchronizing signal.

4. The system according to claim 1, wherein the control apparatus transmits the synchronizing signal to each of the display chips after the playback of the display frames of the image data ends and before display frames of a next image data are played, so as to control the display chips to synchronize the clocks with each other according to the synchronizing signal.

5. The system according to claim 1, wherein the control apparatus further determines the fixed delay time according to a time period required from a time of each of the display chips receiving the image data to a time of the image data being converted into the display frames.

6. The system according to claim 1, wherein the control apparatus is connected with each of the display chips through a wireless local network established by using an IEEE 802.1 AS protocol or through an Ethernet.

7. A control apparatus for distributed video display, comprising:
 a clock;
 a communication module, connected with an image source device and a plurality of display chips through a network, transmitting a playback signal to each of the display chips respectively connected with a plurality of displays; and
 a processor, coupled to the clock and the communication module, controlling the display chips to receive image data from the image source device and convert the image data into display frames capable of being displayed by the displays, wherein
 the processor further transmits a synchronizing signal of the clock to each of the display chips through the communication module so as to control the display chips to synchronize clocks with each other based on time offsets of the clocks of the display chips with respect to the clock of the control apparatus according to the synchronizing signal and sets each of the display chips with a fixed delay time after receiving the image data to synchronously play the display frames on the displays, wherein the processor transmits a synchronizing message of the clock to each of the display chips through the communication module, wherein the synchronizing message comprises a first timestamp of a time when the processor transmits the synchronizing message, or after transmitting the synchronizing message, the processor further transmits a continuation message recording the first timestamp;

wherein each of the display chips receives the synchronizing message, records a second timestamp of receiving the synchronizing message and after a first delay time, transmits a delay request message to the control apparatus and records a third timestamp of transmitting the delay request message; and the processor receives the delay request message through the communication module and transmits a delayed response message to each of the display chips, wherein the delayed response message comprises a fourth timestamp of a time when the control apparatus receives the delay request message.

8. The control apparatus according to claim 7, wherein the processor transmits the synchronizing signal to each of the display chips through the communication module per a predetermined time, or after the playback of the display frames of the image data ends and before display frames of a next image data are played, so as to control the display chips to synchronize the clocks with each other according to the synchronizing signal.

9. The control apparatus according to claim 7, wherein the processor further determines the fixed delay time according to a time period required from a time of each of the display chips receiving the image data to a time of the image data being converted into the display frames.

10. The control apparatus according to claim 7, wherein the communication module is connected with each of the display chips through a wireless local network established by using an IEEE 802.1 AS protocol or through an Ethernet.

11. A control method for distributed video display, applicable to a control apparatus for controlling a plurality of display chips to synchronously play display frames on a plurality of corresponding displays, the method comprising:
 transmitting a synchronizing signal to each of the display chips by the control apparatus, so as to control the display chips to synchronize clocks with each other based on time offsets of the clocks of the display chips with respect to the clock of the control apparatus according to the synchronizing signal; and
 setting each of the display chips with a fixed delay time after receiving image data from an image source device on each of the display chips to synchronously play the display frames converted from the image data on the corresponding displays by the control apparatus,
 wherein the step of transmitting the synchronizing signal to each of the display chips by the control apparatus so as to control the display chips to synchronize the clocks with each other according to the synchronizing signal comprises:
  by the control apparatus, transmitting a synchronizing message to each of the display chips, wherein the synchronizing message comprises a first timestamp of a time when the control apparatus transmitting the synchronizing message, or after transmitting the synchronizing message, further transmitting a continuation message recording the first timestamp;

by each of the display chips, receiving the synchronizing message, recording a second timestamp of receiving the synchronizing message and after a first delay time, transmitting a delay request message to the control apparatus and recording a third timestamp of transmitting the delay request message;

by the control apparatus, receiving the delay request message and transmitting a delayed response message to each of the display chips, wherein the delayed response message comprises a fourth timestamp of a time when the control apparatus receives the delay request message; and by each of the display chips, calculating a time offset of the clock of each of the display chips with respect to the clock of the control apparatus according to the first timestamp, the second timestamp, the third timestamp and the fourth timestamp.

12. The control method according to claim 11, wherein the step of setting each of the display chips with the fixed delay time after receiving the image data from the image source device on each of the display chips to synchronously play the display frames converted from the image data on the corresponding displays by the control apparatus further comprises:

setting each of the display chips to reset a vertical synchronizing (vSync) signal for playing the display frames by using a register in a display interface unit (DIU) in the fixed delay time or before the fixed delay time.

13. The control method according to claim 11, wherein the step of setting the fixed delay time after receiving the image data from the image source device on each of the display chips to synchronously play the display frames converted from the image data on the corresponding displays by the control apparatus comprises:

by the control apparatus, transmitting the synchronizing signal to each of the display chips per a predetermined time, or after the playback of the display frames of the image data ends and before display frames of a next image data are played, so as to control the display chips to synchronize the clocks with each other according to the synchronizing signal.

14. The control method according to claim 11, wherein before the step of setting each of the display chips with the fixed delay time after receiving the image data from the image source device on each of the display chips to synchronously play the display frames converted from the image data on the corresponding displays by the control apparatus, the method further comprises:

determining the fixed delay time according to a time period required from a time of each of the display chips receiving the image data to a time of the image data being converted into the display frames by the control apparatus.

* * * * *